US012666416B2

(12) United States Patent　　　　(10) Patent No.:　US 12,666,416 B2
Ozozlu et al.　　　　　　　　　　　　(45) Date of Patent:　　Jun. 23, 2026

(54) ADVANCED SCHEDULER MECHANISM FOR DOWNLINK FREQUENCY DIVISION DUPLEX SCHEDULING INSTANCES WHEN SOUNDING REFERENCE SIGNAL TRANSMITTER SWITCHING IS IN PROGRESS

(71) Applicant: T-MOBILE INNOVATIONS LLC, Overland Park, KS (US)

(72) Inventors: Akin Ozozlu, McLean, VA (US); Nagi A. Mansour, Arlington, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 393 days.

(21) Appl. No.: 18/216,446

(22) Filed: Jun. 29, 2023

(65) Prior Publication Data

US 2025/0008505 A1　　Jan. 2, 2025

(51) Int. Cl.
*H04W 72/12*　　　(2023.01)
*H04B 1/44*　　　(2006.01)
*H04L 5/14*　　　(2006.01)

(52) U.S. Cl.
CPC .............. *H04W 72/12* (2013.01); *H04B 1/44* (2013.01); *H04L 5/14* (2013.01)

(58) Field of Classification Search
CPC ........ H04W 72/12; H04W 76/15; H04B 1/44; H04L 5/14; H04L 5/006; H04L 5/0044; H04L 5/0051
See application file for complete search history.

(56) References Cited

U.S. PATENT DOCUMENTS

| | | | | |
|---|---|---|---|---|
| 2017/0310435 | A1* | 10/2017 | Wei ........................ | H04L 5/0044 |
| 2019/0052328 | A1* | 2/2019 | Akula ..................... | H04L 5/006 |
| 2021/0359882 | A1* | 11/2021 | Liu ........................ | H04L 5/0051 |
| 2023/0300820 | A1* | 9/2023 | Bansal .................. | H04W 76/15 |
| | | | | 370/329 |

* cited by examiner

*Primary Examiner* — Vinncelas Louis
(74) *Attorney, Agent, or Firm* — Shook, Hardy & Bacon L.L.P.

(57) ABSTRACT

Methods, systems, and a non-transitory computer-readable medium for providing advanced scheduling for downlink frequency division duplex (FDD) resources when sounding reference signal (SRS) transmitter switching is in progress are provided. Initially, the node receives an indication that the user equipment (UE) is sharing at least one antenna between FDD and time division duplex (TDD). The node determines the SRS periodicity for the UE. Based on the SRS periodicity, the node provides advance scheduling for downlink FDD resources when SRS transmitter switching is in progress for an FDD receive slot of the at least one antenna. For example, the node may provide downlink FDD resources to other UEs. Additionally or alternatively, the node may blank the corresponding FDD receive slots of the at least one antenna.

20 Claims, 4 Drawing Sheets

400

MEMORY

404

PROCESSOR(S)

406

PRESENTATION
COMPONENT(S)

408

RADIO(S)

416

402

I/O PORT(S)

412

I/O COMPONENTS

410

POWER SUPPLY

414

TRANSMITTER

418

ADVANCED SCHEDULER MECHANISM FOR DOWNLINK FREQUENCY DIVISION DUPLEX SCHEDULING INSTANCES WHEN SOUNDING REFERENCE SIGNAL TRANSMITTER SWITCHING IS IN PROGRESS

BACKGROUND

Sounding reference signal (SRS) is a carrier-based switching technique that enables SRS transmitted on non-SRS carriers to provide base station reciprocity assisted channel information. SRS may provide improved precoding for beamforming, however, it also poses challenges. During SRS antenna sharing on time division duplex (TDD) bands, if frequency division duplex (FDD) is occurring concurrently with New Radio (NR) carrier aggregation, which uses the TDD band, and both antennas are sharing the same user equipment (UE) antenna, the FDD band suffers significant degradation. This degradation appears in the block error rate (BLER), which may reach as high as 100% during SRS transmission. This high BLER may result in overall FDD throughput degradation, which results in a poor user experience.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

According to aspects herein, methods, systems, and a non-transitory computer-readable medium that providing advanced scheduling for downlink FDD resources when SRS transmitter switching is in progress are provided. Initially, the node receives an indication that the UE is sharing at least one antenna between FDD and TDD. The node determines the SRS periodicity for the UE. Based on the SRS periodicity, the node provides advance scheduling for downlink FDD resources when SRS transmitter switching is in progress for an FDD receive slot of the at least one antenna. For example, the node may provide downlink FDD resources to other UEs. Additionally or alternatively, the node may blank the corresponding FDD receive slots of the at least one antenna.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
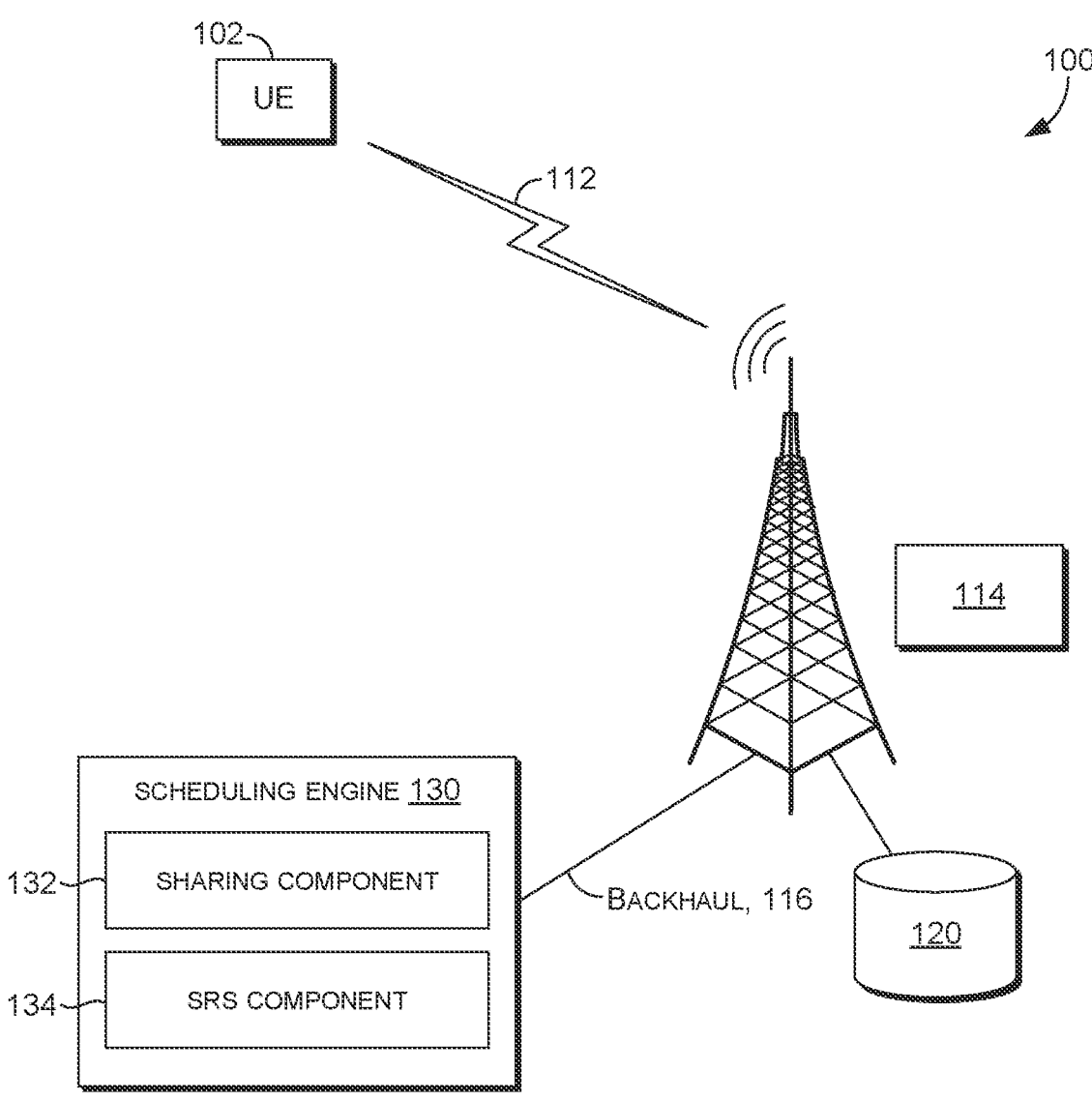
FIG. 1 depicts a diagram of an example network environment in which implementations of the present disclosure may be employed, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
6G Sixth-Generation Cellular Communication System
AI Artificial Intelligence
AS Antenna Sharing
CA Carrier Aggregation
CD-ROM Compact Disk Read Only Memory
CDMA Code Division Multiple Access
eNodeB Evolved Node B
FDD Frequency Division Duplexing
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MIMO Multiple Input Multiple Output
MD Mobile Device
ML Machine Learning
PC Personal Computer
PCS Personal Communications Service
PDA Personal Digital Assistant
PDSCH Physical Downlink Shared Channel
PHICH Physical Hybrid ARQ Indicator Channel
PUCCH Physical Uplink Control Channel
PUSCH Physical Uplink Shared Channel
RAM Random Access Memory
RET Remote Electrical Tilt
RF Radio-Frequency
RFI Radio-Frequency Interference
R/N Relay Node
RNR Reverse Noise Rise
ROM Read Only Memory RSRP Reference Signal Receive Power RSRQ Reference Signal Receive Quality RSSI Received Signal Strength Indicator SINR Transmission-to-Interference-Plus-Noise Ratio SNR Transmission-to-noise ratio SON Self-Organizing Networks TDMA Time Division Multiple Access TXRU Transceiver (or Transceiver Unit)

UE User Equipment

UMTS Universal Mobile Telecommunications Systems

WCD Wireless Communication Device (interchangeable with UE)

Further, various technical terms are used throughout this description. An illustrative resource that fleshes out various aspects of these terms can be found in Newton's Telecom Dictionary, $32^{nd}$ Edition (2022). These definitions are intended to provide a clearer understanding of the ideas disclosed herein but are not intended to limit the scope of the present invention. The definitions and terms should be interpreted broadly and liberally to the extent allowed by the meaning of the words offered in the above-cited reference.

Embodiments of the technology may take the form of, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

By way of background, a traditional telecommunications network employs a plurality of base stations (i.e., access point, node, cell sites, cell towers) to provide network coverage. The base stations are employed to broadcast and transmit transmissions to user devices of the telecommunications network. An access point may be considered to be a portion of a base station that may comprise an antenna, a radio, and/or a controller. In aspects, an access point is defined by its ability to communicate with a user equipment (UE), such as a wireless communication device (WCD), according to a single protocol (e.g., 3G, 4G, LTE, 5G, and the like); however, in other aspects, a single access point may communicate with a UE according to multiple protocols. As used herein, a base station may comprise one access point or more than one access point.

Factors that can affect the telecommunications transmission include, e.g., location and size of the base stations, and frequency of the transmission, among other factors. The base stations are employed to broadcast and transmit transmissions to user devices of the telecommunications network. Traditionally, the base station establishes uplink (or downlink) transmission with a mobile handset over a single frequency that is exclusive to that particular uplink connection (e.g., an LTE connection with an EnodeB or a New Radio (NR) connection). In this regard, typically only one active uplink connection can occur per frequency. The base station may include one or more sectors served by individual transmitting/receiving components associated with the base station (e.g., antenna arrays controlled by an EnodeB). These transmitting/receiving components together form a multi-sector broadcast arc for communication with mobile handsets linked to the base station.

As used herein, UE (also referenced herein as a user device or a wireless communication device) can include any device employed by an end-user to communicate with a wireless telecommunications network. A UE can include a mobile device, a mobile broadband adapter, a fixed location or temporarily fixed location device, or any other communications device employed to communicate with the wireless telecommunications network. For an illustrative example, a UE can include cell phones, smartphones, tablets, laptops, small cell network devices (such as micro cell, pico cell, femto cell, or similar devices), and so forth. Further, a UE can include a sensor or set of sensors coupled with any other communications device employed to communicate with the wireless telecommunications network: such as, but not limited to, a camera, a weather sensor (such as a rain gage, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby base station or access point.

A time division duplex (TDD) system uses time division multiplexing to separate uplink and downlink signals. It emulates full duplex communication over a half-duplex communication link. TDD provides flexibility in situations where there is asymmetry of uplink and downlink data rates. As the amount of uplink data increases, more communication capacity can be allocated by the network operator, and when the traffic load is lighter, capacity can be decreased by the network operator. Similarly, as the amount of downlink data increases, more communication capacity can be allocated by the network operator, and when the traffic load is lighter, capacity can be decreased by the network operator.

In contrast, a frequency division duplex (FDD) system uses separate frequency bands for uplink and downlink communications. It splits the available frequency spectrum into two parts. One part is used for uplink communications and the other part is used for downlink communications. FDD systems result in higher peak and average throughput speeds in uplink and downlink than TDD at equal bandwidths. If FDD and TDD both have a capacity of 10 MHz, FDD performs better because have FDD has 10 MHz for both uplink and downlink, while uplink and downlink in TDD has to share 10 MHz in the time domain. In other words, TDD does not require paired spectrum as both uplink and downlink communication happens through the same channel.

Carrier aggregation is a technique that allows an uplink or downlink transmission to occur over more than one frequency. As multiple frequency blocks are assigned to the same UE, the throughput is improved. Put another way, the uplink or downlink bandwidth available to the UE is increased. Carrier aggregation can be accomplished using an additional TDD layer or a FDD layer.

Sounding reference signal (SRS) is a carrier-based switching technique that enables SRS transmitted on non-SRS carriers to provide base station reciprocity assisted channel information. SRS may provide improved precoding for beamforming, however, it also poses challenges. During SRS antenna sharing on TDD bands, if FDD is occurring concurrently with New Radio (NR) carrier aggregation, which uses the TDD band, and both antennas are sharing the same user equipment (UE) antenna, the FDD band suffers significant degradation. This degradation appears in the block error rate (BLER), which may reach as high as 100% during SRS transmission. This high BLER may result in overall FDD throughput degradation, which results in a poor user experience.

Sounding reference signal (SRS) antenna switching is a beamforming method that relies on uplink/downlink reciprocity which is used for channel estimation. In some systems, the SRS transmitter switching mechanisms uses FDD receive chains to send SRS signals from the shared receiver antennas. Unfortunately, this results in high block error rates in FDD downlink communications in scenarios where FDD/TDD carrier aggregation is being implemented. Since the FDD channel is active at all times, SRS transmissions cause interference with FDD downlink communications. Although increasing the SRS periodicity may result in less interference, it also reduces the granularity of the beamforming.

The present disclosure is directed to systems, methods, and computer readable media for providing advanced scheduling for downlink FDD resources when SRS transmitter switching is in progress. Initially, the node receives an indication that the UE is sharing at least one antenna between FDD and TDD. The node determines the SRS periodicity for the UE. Based on the SRS periodicity, the node provides advance scheduling for downlink FDD resources when SRS transmitter switching is in progress for an FDD receive slot of the at least one antenna. For example, the node may provide downlink FDD resources to other UEs. Additionally or alternatively, the node may blank the corresponding FDD receive slots of the at least one antenna.

According to aspects of the technology described herein, a method for providing advanced scheduling for downlink FDD resources is provided. The method comprises receiving an indication, at a node, a user equipment (UE) is sharing at least one antenna between frequency division duplex (FDD) and time division duplex (TDD). The method also comprises determining, at the node, a sounding reference signal (SRS) periodicity for the UE. The method further comprises, based on the SRS periodicity, providing, at the node, advanced scheduling for downlink FDD resources when SRS transmitter switching is in progress for an FDD receive slot of the at least one antenna.

According to further aspects of the technology described herein, one or more computer-readable media having computer-executable instructions embodied thereon that, when executed by at least one computing device, cause the computing device to perform operations for providing advanced scheduling for downlink FDD resources. The operations comprise receiving an indication, at a node, a user equipment (UE) is sharing at least one antenna between frequency division duplex (FDD) and time division duplex (TDD). The operations also comprise determining, at the node, a sounding reference signal (SRS) periodicity for the UE. The operations further comprise, based on the SRS periodicity, providing, at the node, advanced scheduling for downlink FDD resources when SRS transmitter switching is in progress for an FDD receive slot of the at least one antenna.

According to even further aspects of the technology described herein, a system for providing advanced scheduling for downlink FDD resources is provided. The system comprises a user equipment (UE). The system also comprises a node configured to wirelessly communicate with the UE. The node is configured to receive an indication the UE is sharing at least one antenna between frequency division duplex (FDD) and time division duplex (TDD). The node is also configured to determine a sounding reference signal (SRS) periodicity for the UE. The node is further configured to, based on the SRS periodicity, provide advanced scheduling for downlink FDD resources when SRS transmitter switching is in progress for an FDD receive slot of the at least one antenna.

FIG. 1 illustrates an example of a network environment 100 suitable for use in implementing embodiments of the present disclosure. The network environment 100 is but one example of a suitable network environment and is not intended to suggest any limitation as to the scope of use or functionality of the disclosure. Neither should the network environment 100 be interpreted as having any dependency or requirement to any one or combination of components illustrated.

Network environment 100 includes UE 102, access point 114 (which may be a cell site, access point, or the like), and one or more communication channels 112. The communication channel 112 can communicate over frequency bands assigned to the carrier. In network environment 100, user devices (UEs) may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 1000) that communicates via wireless communications with the access point 114 in order to interact with a public or private network.

Figure 4:
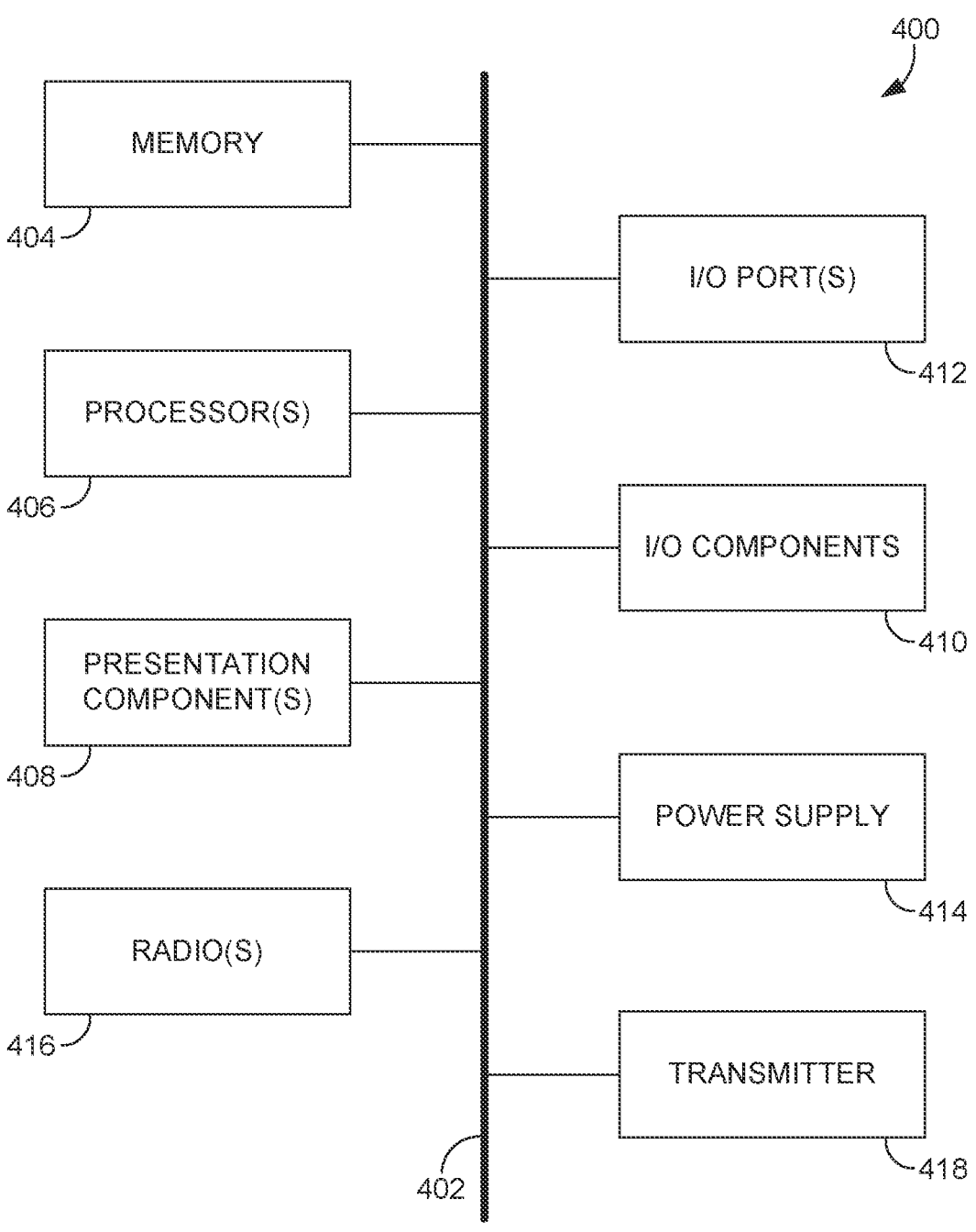
FIG. 4 depicts an exemplary computing device suitable for use in implementations of the present disclosure, in accordance with aspects herein.

In some aspects, UE 102 may correspond to computing device 400 in FIG. 4. Thus, a UE can include, for example, a display(s), a power source(s) (e.g., a battery), a data store(s), a speaker(s), memory, a buffer(s), a radio(s) and the like. In some implementations, for example, a UE 102 comprise a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, 6G, LTE, CDMA, or any other type of network. In some cases, UE 102 in network environment 100 can optionally utilize one or more communication channels 112 to communicate with other computing devices (e.g., a mobile device(s), a server(s), a personal computer(s), etc.) through access point 114.

The network environment 100 may be comprised of a telecommunications network(s), or a portion thereof. A telecommunications network might include an array of devices or components (e.g., one or more access points), some of which are not shown. Those devices or components may form network environments similar to what is shown in FIG. 1, and may also perform methods in accordance with the present disclosure. Components such as terminals, links, and nodes (as well as other components) can provide connectivity in various implementations. Network environment 100 can include multiple networks, as well as being a network of networks, but is shown in more simple form so as to not obscure other aspects of the present disclosure.

The one or more communication channels 112 can be part of a telecommunication network that connects subscribers to their immediate telecommunications service provider (i.e., home network carrier). In some instances, the one or more communication channels 112 can be associated with a telecommunications provider that provides services (e.g., 3G network, 4G network, LTE network, 5G network, 6G, and the like) to user devices, such as UE 102. For example, the one or more communication channels may provide voice, SMS, and/or data services to UE 102, or corresponding users that are registered or subscribed to utilize the services provided by the telecommunications service provider. The one or more communication channels 112 can comprise, for example, a 1x circuit voice, a 3G network (e.g., CDMA, CDMA2000, WCDMA, GSM, UMTS), a 4G network (WiMAX, LTE, HSDPA), or a 5G network or a 6G network.

In some implementations, access point 114 is configured to communicate with a UE, such as UE 102, that is located within the geographic area, or cell, covered by radio antennas of access point 114. Access point 114 may include one or more access points, base transmitter stations, radios, antennas, antenna arrays, power amplifiers, transmitters/receivers, digital signal processors, control electronics, GPS equipment, and the like.

As shown, access point 114 is in communication with a scheduling engine 130 and at least a network database 120 via a backhaul channel 116. Access point 114 may store information and data communicated by UE 102 at a network database 120. Alternatively, the access point 114 may automatically retrieve information and data from UE 102 and similarly store the data in the network database 120. The information and data may be communicated or retrieved and stored periodically within a predetermined time interval which may be in seconds, minutes, hours, days, months, years, and the like.

With the incoming of new data, the network database 120 may be refreshed with the new data every time, or within a predetermined time threshold so as to keep the status data stored in the network database 120 current. For example, the data may be received at or retrieved by the access point 114 or every 10 minutes and the data stored at the network database 120 may be kept current for 30 days, which means that status data that is older than 30 days would be replaced by newer status data at 10 minute intervals. The information and data can include, for example, information corresponding to the UE (e.g., the UE is sharing at least one antenna), SRS periodicity, service state status, the UE's current geographic location, a current time, a strength of the wireless signal, available networks, and the like.

The scheduling engine 130 comprises sharing component 132 and a SRS component 134. Although the scheduling engine 130 is shown as a single component comprising the sharing component 132 and the SRS component 134, it is also contemplated that each of the sharing component 132 and the SRS component 134, may reside at different locations, be its own separate entity, and the like, within the home network carrier system.

The scheduling engine 130 is generally configured to provide advanced scheduling for downlink FDD resources. More particularly, the scheduling engine 130 provides advanced scheduling for downlink FDD resources when SRS transmitter switching is in progress.

The sharing component 130 initially receives an indication that the UE is sharing at least one antenna between FDD and TDD. The SRS component 132 determines the SRS periodicity for the UE. Based on the SRS periodicity, the SRS component 132 may cause the node to provide downlink FDD resources to other UEs. Additionally or alternatively, the SRS component 132 may cause the node to blank the corresponding FDD receive slots of the at least one antenna.

Figure 2:
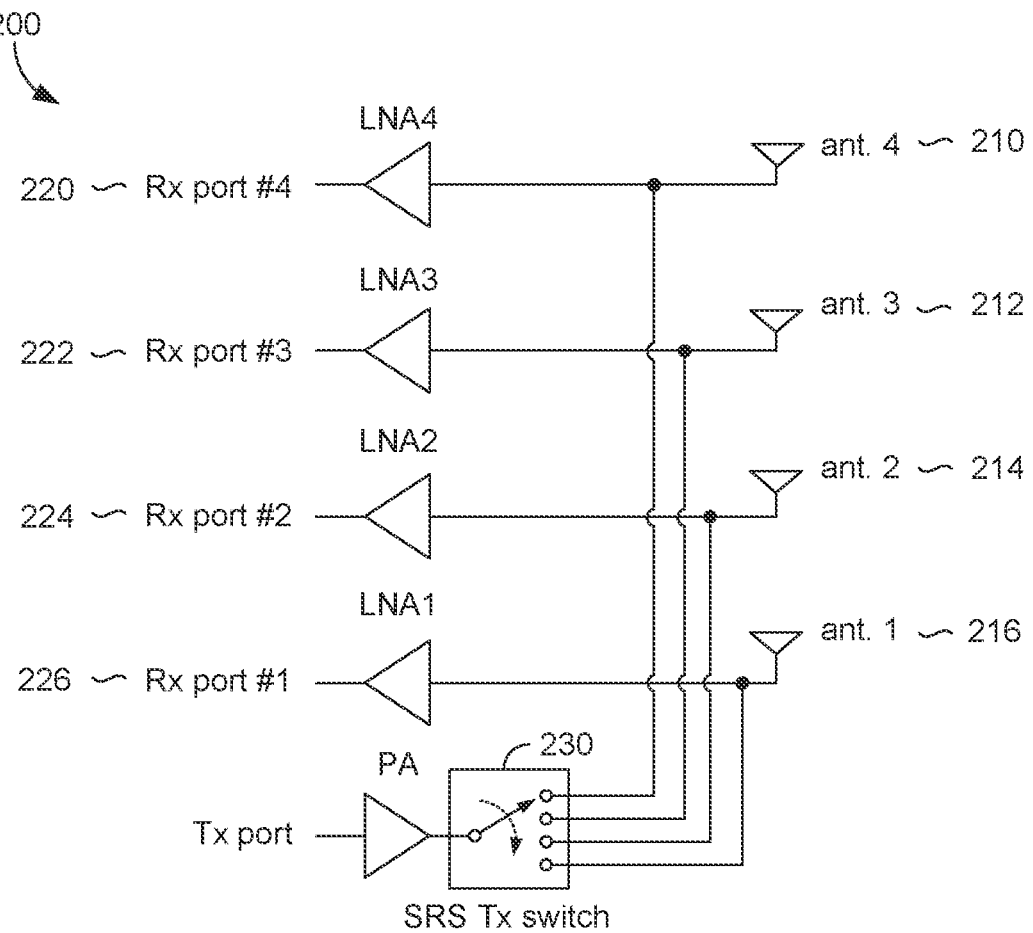
FIG. 2 depicts an example SRS transmitter switching mechanism shared between receiver antennas, in accordance with aspects herein.

FIG. 2 depicts an example SRS transmitter switching mechanism shared between receiver antennas 200, in accordance with aspects herein. As illustrated, the UE includes four antennas 210, 212, 214, 216. Each antenna 210, 212, 214, 216 includes a corresponding receiving port 220, 222, 224, 226. Additionally, an SRS transmitter switch 230 enables the SRS signal to be communicated using the shared antennas 210, 212, 214, 216. For example, when the SRS signal is in progress for slot 1 (as illustrated), the downlink FDD communications for the corresponding antenna (in this case antenna 210 and receiving port 220) may experience a nearly one hundred percent BLER. Accordingly, since the node is aware when the UE will send the SRS signal, the node can reallocate the downlink FDD resources to other UEs and/or blank the corresponding FDD receive slots for the UE.

Figure 3:
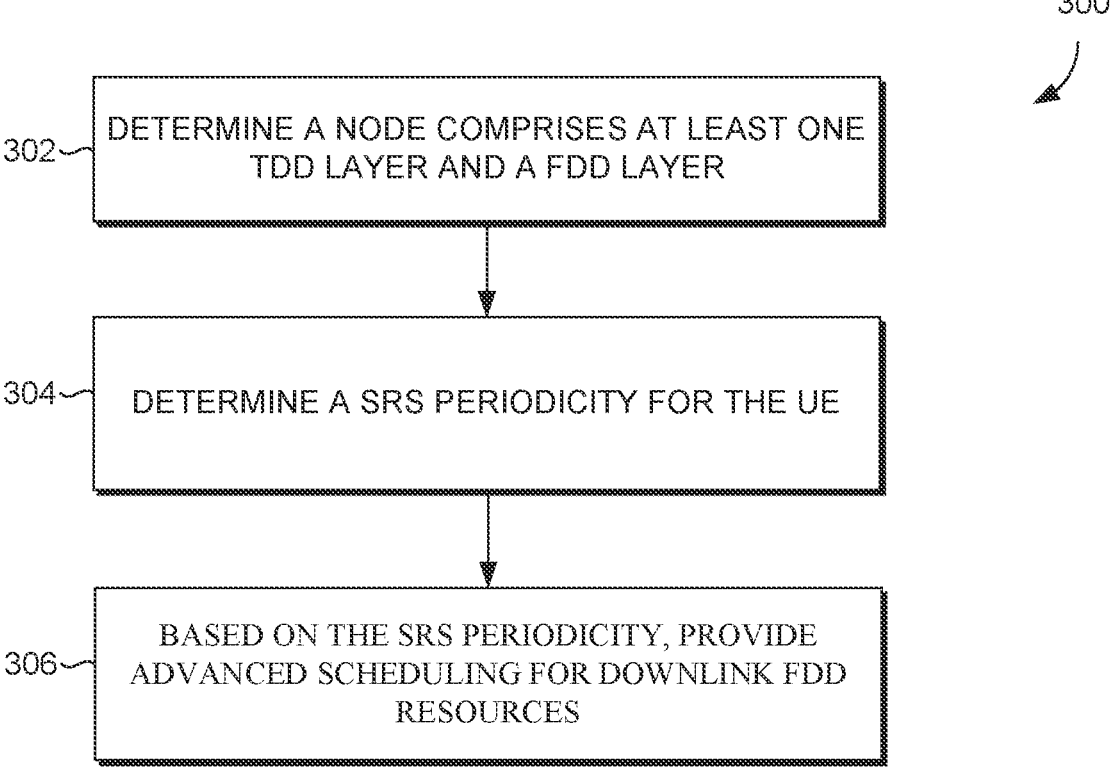
FIG. 3 is a flow diagram of a method for providing advanced scheduling for downlink FDD resources when sounding reference signal transmitter switching is in progress, in accordance with aspects herein.

Turning now to FIG. 3, a flow diagram depicting an exemplary method 300 for delivering goods to a connected vehicle using unmanned aerial vehicles is provided, in accordance with aspects of the present invention. Method 300 may be performed by any computing device (such as computing device described with respect to FIG. 4) with access to a scheduling engine (such as the one described with respect to FIG. 2) or by one or more components of the network environment described with respect to FIG. 1 (such as UE 102, access point 114, and/or scheduling engine 130).

Initially at step 302, an indication is received at a node that a UE is sharing at least one antenna between FDD and TDD. For example, the UE may be sharing the at least one antenna between FDD and TDD at the hardware level, as illustrated in FIG. 2. FDD is a method for establishing a full duplex communications link. FDD uses two different radio frequencies, one for transmitter operation and the other for receiver operation. In operation, the transmitter and receiver as assigned to different communication channels. TDD is a method for establishing a full-duplex communication link. Uplink communications are separated from downlink communications by the allocation of different time slots in the same frequency band. TDD allows asymmetric flow for uplink and downlink data transmission. In some aspects, the indication is communicated to the node in a radio resource control signal.

At step 304, SRS periodicity is determined for the UE. Sounding reference signals are uplink physical signals employed by UE for uplink channel sounding, including channel quality estimation and synchronization. The SRS periodicity is defined by the node for each UE in the coverage area of the node. Although the node could increase the SRS periodicity to reduce interference with the FDD downlink communications, it would reduce the granularity of the beamforming.

To avoid reduce granularity of the beamforming, at step 306, the node provides advanced scheduling for downlink FDD resources when SRS transmitter switching is in progress for an FDD receive slot of the at least one antenna. In one aspect, the advanced scheduling provides the downlink FDD resources intended for the FDD receive slot to other UEs. For example, the node may determine other UEs that do not have SRS transmitter switching in progress and allocate the downlink FDD resources to those UEs. Additionally or alternatively, the advanced scheduling blanks the corresponding FDD receive slot. As a result, the spectral efficiency is increased and the amount of energy burned is reduced (by avoiding sending inefficient data). Moreover, in aspects, the node does not increase the SRS periodicity.

FIG. 4 depicts an exemplary computing device suitable for use in implementations of the present disclosure, in accordance with aspects herein. With continued reference to FIG. 4, computing device 400 includes bus 410 that directly or indirectly couples the following devices: memory 412, one or more processors 414, one or more presentation components 416, input/output (I/O) ports 418, I/O components 420, radio(s) 424, and power supply 422. Bus 410 represents what may be one or more busses (such as an address bus, data bus, or combination thereof). Although the devices of FIG. 4 are shown with lines for the sake of clarity, in reality, delineating various components is not so clear, and metaphorically, the lines would more accurately be grey and fuzzy. For example, one may consider a presentation component such as a display device to be one of I/O components 420. Also, processors, such as one or more processors 414, have memory. The present disclosure hereof recognizes that such is the nature of the art, and reiterates that FIG. 4 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 4 and refer to "computer" or "computing device."

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

Computing device 400 typically includes a variety of computer-readable media. Computer-readable media can be any available media that can be accessed by computing device 400 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 412 includes computer-storage media in the form of volatile and/or nonvolatile memory. Memory 412 may be removable, nonremovable, or a combination thereof. Exemplary memory includes solid-state memory, hard drives, optical-disc drives, etc. Computing device 400 includes one or more processors 406 that read data from various entities such as bus 410, memory 412 or I/O components 420. One or more presentation components 416 present data indications to a person or other device. Exemplary one or more presentation components 416 include a display device, speaker, printing component, vibrating component, etc. I/O ports 418 allow computing device 400 to be logically coupled to other devices including I/O components 420, some of which may be built into computing device 400. Illustrative I/O components 420 include a microphone, joystick, game pad, satellite dish, scanner, printer, wireless device, etc.

The radio(s) 424 represents one or more radios that facilitate communication with a wireless telecommunications network. While a single radio 424 is shown in FIG. 4, it is contemplated that there may be more than one radio 424 coupled to the bus 410. Illustrative wireless telecommunications technologies include CDMA, GPRS, TDMA, GSM, and the like. The radio 424 may additionally or alternatively facilitate other types of wireless communications including Wi-Fi, WiMAX, LTE, 3G, 4G, LTE, 5G, NR, VoLTE, or other VoIP communications. As can be appreciated, in various embodiments, radio 424 can be configured to support multiple technologies and/or multiple radios can be utilized to support multiple technologies. A wireless telecommunications network might include an array of devices, which are not shown so as to not obscure more relevant aspects of the invention. Components such as a access point, a communications tower, or even access points (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method comprising:
   receiving an indication, at a node, that a first user equipment (UE) is sharing at least one antenna between frequency division duplex (FDD) and time division duplex (TDD);
   determining, at the node, a sounding reference signal (SRS) periodicity for the first UE and a second UE; and
   based on the SRS periodicity, providing, at the node, advanced scheduling for downlink FDD resources when SRS transmitter switching is in progress for an FDD receive slot of the at least one antenna, wherein the advanced scheduling comprises providing the downlink FDD resources intended for the FDD receive slot to the second UE that does not have SRS transmitter switching in progress.

2. The method of claim 1, wherein the node provides the advanced scheduling when the node determines the first UE will send the SRS signal.

3. The method of claim 1, wherein the advanced scheduling blanks the corresponding FDD receive slot.

4. The method of claim 1, wherein the indication is communicated to the node in a radio resource control signal.

5. The method of claim 1, further comprising not increasing, at the node, the SRS periodicity.

6. The method of claim 1, further comprising, determining, at the node, other UEs that do not have SRS transmitter switching in progress.

7. The method of claim 1, wherein the first UE is sharing the at least one antenna between FDD and TDD at the hardware level of the UE.

8. One or more non-transitory computer-readable media having computer-executable instructions embodied thereon that, when executed by at least one computing device, cause the computing device to perform operations, the operations comprising:

receiving an indication, at a node, that a first user equipment (UE) is sharing at least one antenna between frequency division duplex (FDD) and time division duplex (TDD);

determining, at the node, a sounding reference signal (SRS) periodicity for the first UE and a second UE; and based on the SRS periodicity, providing, at the node, advanced scheduling for downlink FDD resources when SRS transmitter switching is in progress for an FDD receive slot of the at least one antenna, wherein the advanced scheduling comprises providing the downlink FDD resources intended for the FDD receive slot to the second UE that does not have SRS transmitter switching in progress.

9. The media of claim 8, wherein the node provides the advanced scheduling when the node determines the first UE will send the SRS signal.

10. The method of claim 8, wherein the advanced scheduling blanks the corresponding FDD receive slot.

11. The media of claim 8, wherein the indication is communicated to the node in a radio resource control signal.

12. The media of claim 8, further comprising not increasing, at the node, the SRS periodicity.

13. The media of claim 8, further comprising, determining, at the node, other UEs that do not have SRS transmitter switching in progress.

14. The media of claim 8, wherein the first UE is sharing the at least one antenna between FDD and TDD at the hardware level of the UE.

15. A system comprising:

user equipment (UE); and a node configured to wirelessly communicate with the UE, wherein the node is configured to:

receive an indication that the user equipment (UE) is sharing at least one antenna between frequency division duplex (FDD) and time division duplex (TDD);

determine a sounding reference signal (SRS) periodicity for the UE and a second UE; and based on the SRS periodicity, provide advanced scheduling for downlink FDD resources when SRS transmitter switching is in progress for an FDD receive slot of the at least one antenna, wherein the advanced scheduling comprises providing the downlink FDD resources intended for the FDD receive slot to the second UE that does not have SRS transmitter switching in progress.

16. The system of claim 15, wherein the node provides the advanced scheduling when the node determines the first UE will send the SRS signal.

17. The system of claim 15, wherein the advanced scheduling blanks the corresponding FDD receive slot.

18. The system of claim 15, wherein the indication is communicated to the node in a radio resource control signal.

19. The system of claim 15, further comprising not increasing, at the node, the SRS periodicity.

20. The system of claim 15, further comprising, determining, at the node, other UEs that do not have SRS transmitter switching in progress.

* * * * *